United States Patent [19]

Shioji et al.

[11] Patent Number: 5,233,449
[45] Date of Patent: Aug. 3, 1993

[54] LIQUID-CRYSTAL COLOR DISPLAY WITH COMB-SHAPED PIXEL ELECTRODES PARTIALLY OVERLAPPING AT THE ELECTRODE ENDS

[75] Inventors: Mitsuaki Shioji, Nara; Kunihiko Ito, Yamatokoriyama; Hiroshi Fukutani; Kazuhiko Akimoto, both of Nara, all of Japan

[73] Assignee: Sharp Kabushiki Kaisha, Osaka, Japan

[21] Appl. No.: 787,020

[22] Filed: Nov. 4, 1991

[30] Foreign Application Priority Data

Nov. 7, 1990 [JP] Japan .................. 2-303077

[51] Int. Cl.⁵ .................. G02F 1/1335; G02F 1/1343
[52] U.S. Cl. .................. 359/68; 359/67; 359/87
[58] Field of Search .................. 359/67, 68, 87

[56] References Cited

U.S. PATENT DOCUMENTS

| | | | |
|---|---|---|---|
| 3,820,875 | 6/1974 | Bohmer | 359/67 |
| 4,389,095 | 6/1983 | Teshima et al. | 359/81 |
| 4,579,424 | 4/1986 | Matsukawa et al. | 359/68 |
| 4,902,103 | 2/1990 | Miyake et al. | 359/68 |
| 4,957,350 | 9/1990 | Ito et al. | 359/68 |

FOREIGN PATENT DOCUMENTS

| | | |
|---|---|---|
| 0219064 | 4/1987 | European Pat. Off. |
| 0317850 | 5/1989 | European Pat. Off. |
| 0434220 | 6/1991 | European Pat. Off. |
| 63-70828 | 3/1988 | Japan . |
| 0136120 | 5/1989 | Japan ............ 359/68 |
| 0103825 | 4/1991 | Japan ............ 359/67 |

Primary Examiner—William L. Sikes
Assistant Examiner—Anita Pellman Gross
Attorney, Agent, or Firm—David G. Conlin; Robert F. O'Connell

[57] ABSTRACT

In a liquid-crystal color display having a pair of light-transmitting substrates disposed opposite each other sandwiching a liquid crystal layer between them and color selecting members and a light blocking member provided on one of the pair of light-transmitting substrates, light-transmitting pixel electrodes are disposed on the liquid crystal layer side of one of the light-transmitting substrates. The pixel electrodes disposed adjacent to each other correspond to different color selecting members and are formed extending into each other's display area in alternating fashion. Accordingly, display patterns formed by adjacent pixel electrodes are allowed to overlap each other, thus making it possible to increase the number of display patterns per unit display area.

3 Claims, 3 Drawing Sheets

LIQUID-CRYSTAL COLOR DISPLAY WITH COMB-SHAPED PIXEL ELECTRODES PARTIALLY OVERLAPPING AT THE ELECTRODE ENDS

BACKGROUND OF THE INVENTION

1. Field of the Invention

The present invention relates to a liquid-crystal color display.

2. Description of the Prior Art

It is known to provide a liquid-crystal color display in which, as shown in FIG. 4, display patterns are formed by portions where transparent comb electrodes 21 and 22 on the SEG (segment) side, serving as pixel electrodes, overlap transparent electrodes 23 and 24 on the COM (common) side, respectively. Each element of the SEG-side pixel electrode 21 faces a red color filter not shown, while each element of SEG-side pixel electrode 22 faces a green color filter not shown. The display patterns are independent individually and are connected to different signal lines.

In the above prior art liquid-crystal color display, however, as shown in FIG. 5, the display area C where display patterns are defined by the SEG-side pixel electrode 21 is separated from the display area D where display patterns are defined by the SEG-side pixel electrode 22, and the display areas C and D cannot be brought in contact with each other or made to overlap. It is therefore not possible to make a plurality of display patterns overlap each other within one display area, the resulting problem being an inability to further increase the number of display patterns per unit display area.

SUMMARY OF THE INVENTION

It is accordingly an object of the invention to provide a liquid-crystal color display which permits a plurality of display patterns to overlap each other within one display area and thereby achieves an increase in the number of display patterns per unit display area.

To achieve the above object, the present invention provides a liquid-crystal color display comprising: a plurality of color selecting members provided for transmitting light of specific colors respectively and formed over one entire surface of one of a pair of light-transmitting substrates disposed opposite each other sandwiching a liquid crystal layer between them, the one entire surface being on the side facing the liquid crystal layer; a light blocking member interposed between the adjacent color selecting member; and light-transmitting pixel electrodes which are respectively provided in the display areas on the sides facing the liquid crystal layer of the pair of light-transmitting substrates and which, in response to electrical signals, alter the molecular alignment in the liquid crystal layer in the portion thereof facing the specific color selecting member selected in accordance with the color to be displayed in the display area, the liquid-crystal color display being characterized in that the pixel electrodes disposed adjacent to each other correspond to different color selecting members and are formed in such a manner as to extend into each other's display area in alternating fashion.

According to the above construction, since the pixel electrodes disposed adjacent to each other are formed extending into each other's display area in alternating fashion, display patterns formed by the adjacent pixel electrodes are made to overlap each other within one display area, which serves to increase the number of display patterns per unit display area.

As is apparent from the above description, in the liquid-crystal color display of the invention, since the pixel electrodes disposed adjacent to each other are formed extending into each other's display area, display patterns formed by the adjacent pixel electrodes can be made to overlap each other within one display area. Therefore, according to the invention, the number of display patterns per unit display area can be increased.

BRIEF DESCRIPTION OF THE DRAWINGS

Other and further objects, features, and advantages of the invention will be more explicit form the following detailed description taken with reference to the drawings wherein.

DETAILED DESCRIPTION OF THE PREFERRED EMBODIMENTS

Figure 1:
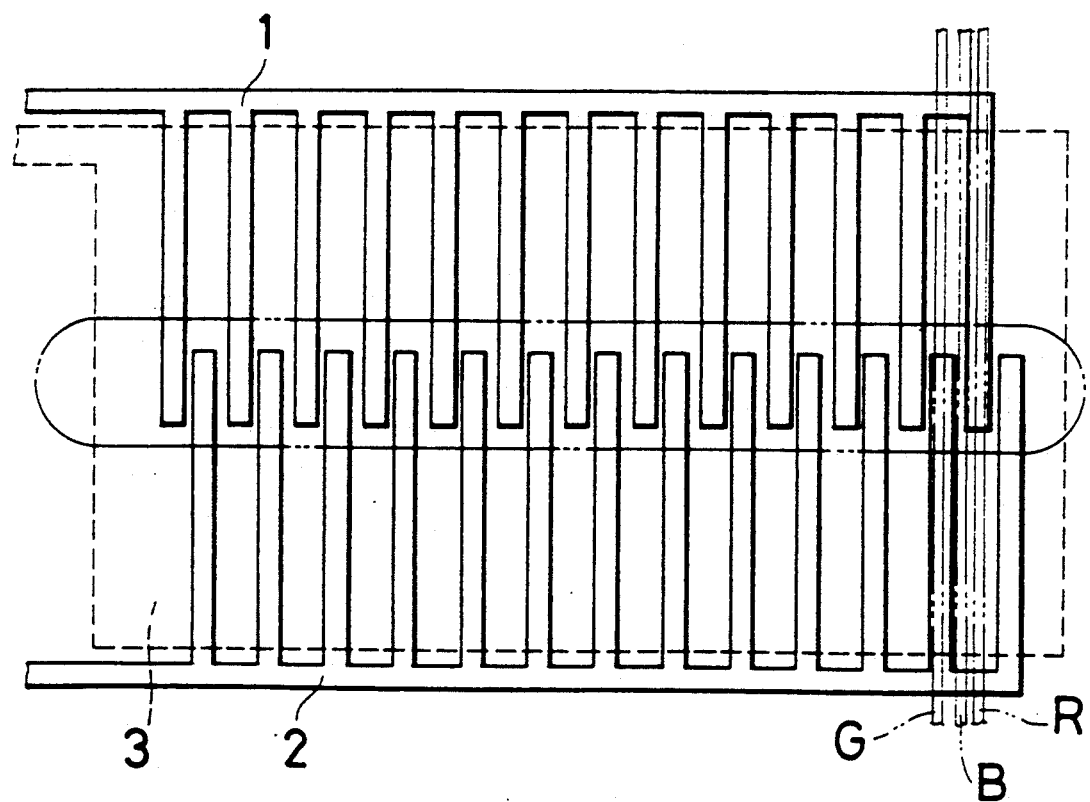
FIG. 1 is a detail drawing of an essential portion of a liquid-crystal color display in one embodiment of the invention.
Figure 2:
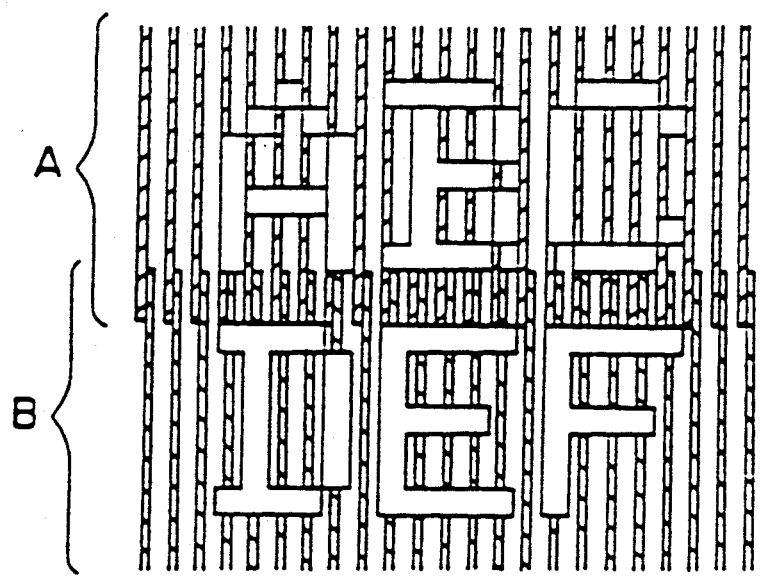
FIG. 2 is a diagram showing how display areas overlap each other in the above embodiment.

Now referring to the drawing, preferred embodiments of the invention are described below.

Figure 3:
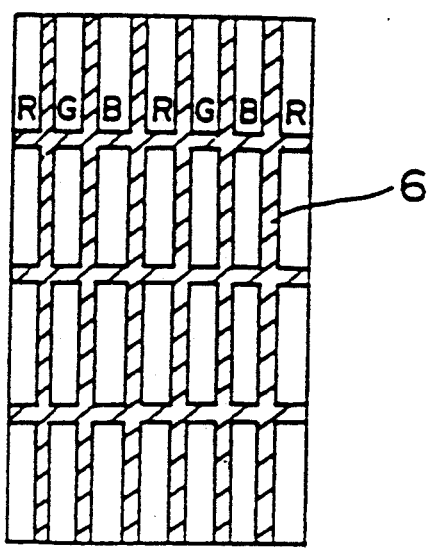
FIG. 3 is a plan view showing color filters and a mask in accordance with the above embodiment.
Figure 4:
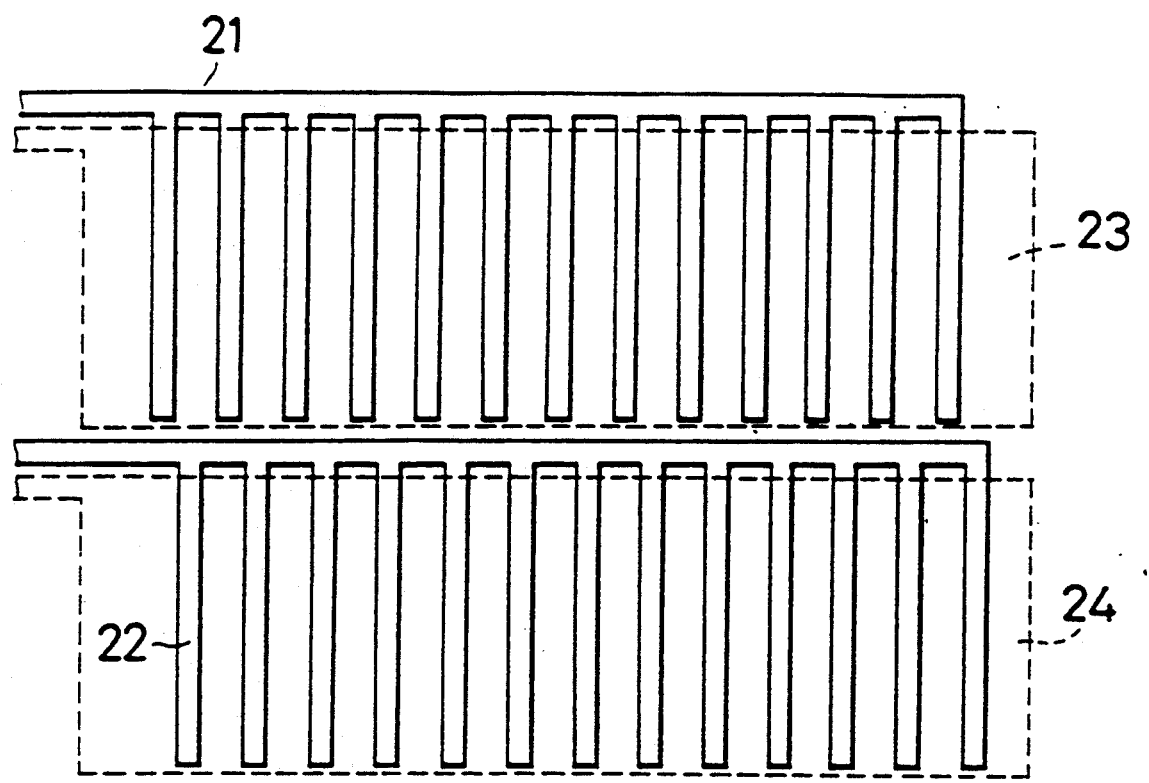
FIG. 4 is a detail drawing of an essential portion of a prior art liquid-crystal color display.
Figure 5:
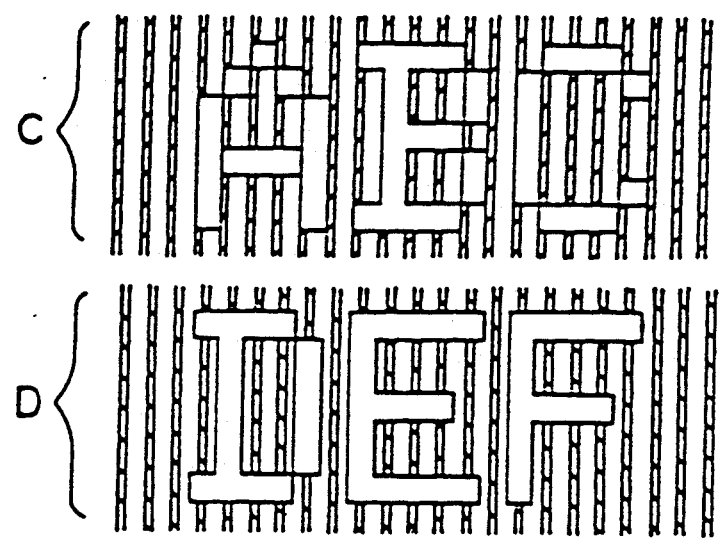
FIG. 5 is a drawing showing display areas in the prior art liquid-crystal color display.

FIG. 1 is a detail drawing of an essential portion of a liquid-crystal color display in one embodiment of the invention. In this embodiment, transparent comb electrodes 1 and 2, formed on the SEG-side and serving as pixel electrodes, are disposed facing a red color filter R and a green color filer G, respectively. The reference sign B indicates a blue color filter. Two light-transmitting substrates, one on the SEG side and the other on the COM side, are disposed opposite each other sandwiching a liquid crystal layer (not shown) between them. The color filters, red R, green G, and blue B, are disposed over one entire surface of the SEG-side light-transmitting substrate, the entire surface being on the side facing the liquid crystal layer. The SEG-side transparent comb electrodes 1 and 2 are formed on the liquid crystal layer side of the SEG-side light-transmitting substrate. The SEG-side transparent comb electrodes 1 and 2 are arranged extending into each other's area in alternating fashion. Also, the SEG-side transparent electrodes 1 and 2 share a COM-side electrode 3 disposed opposite them across the liquid crystal layer not shown and form two different display patterns, upper and lower, respectively driven independently of each other. In FIG. 3 is shown a mask 6 which serves as a light blocking member formed extending between the color filters R, G, B.

In this embodiment, production of the above display patterns is achieved by applying varying voltages to the SEG-side transparent comb electrodes 1, 2 and the COM-side electrode 3 and thereby varying the molecular alignment in the liquid crystal layer. Also, in this embodiment, overlapping portions 5 are formed where the display area defined by the SEG-side transparent electrode 1 overlaps the display area defined by the SEG-side transparent electrode 2. That is, in the liquid-crystal color display of this embodiment, since the display area A, where the red display pattern defined by the SEG-side transparent electrode 1 is formed, overlaps the display area B where the green display area defined by the SEG-side transparent electrode 2 is formed, the number of display patterns per unit display area can be increased.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal color display comprising:

a plurality of color selecting members provided for transmitting light of specific colors, respectively, and formed over one entire surface of one of a pair of light-transmitting substrates disposed opposite each other, which substrates sandwich a liquid crystal layer between them, the one entire surface being on the side of said one substrate facing the liquid crystal layer;

a light blocking member interposed between the adjacent color selecting members; and a pair of light-transmitting comb-shaped pixel electrode groups which are disposed adjacent each other in portions of the display area on the side facing the liquid crystal layer of said one light-transmitting substrate and light transmitting comb-shaped pixel electrodes provided in the display area of the other substrate, all of which pixel electrodes, in response to electrical signals, alter the molecular alignment in the liquid crystal layer in the portion between the other substrate and the specific color selecting member elected in accordance with the color to be displayed in the display area, the liquid-crystal color display being characterized in that the comb-shaped pixel electrode groups disposed adjacent to each other on the side of said one substrate correspond to different color selecting members and are formed in such a manner as to partially overlap at the ends of said electrodes and extend into each other's display area portions in alternating fashion to decrease the gap between adjacent different, non-simultaneously displayed, display patterns.

2. A liquid-crystal color display as set forth in claim 1, wherein: the pair of light-transmitting substrates disposed opposite each other with the liquid crystal layer sandwiched between them are provided with segment-side and common-side transparent electrodes, respectively, the color selecting members and the light blocking member being provided on the substrate on which the segment-side transparent electrodes are formed.

3. A liquid-crystal color display as set forth in claim 1, wherein: the color selecting members are color filters of three colors, red, green, and blue.

* * * * *